(12) United States Patent
Ortega, III et al.

(10) Patent No.: US 12,096,053 B2
(45) Date of Patent: Sep. 17, 2024

(54) CONTENT DELIVERY PLATFORM

(71) Applicant: Streaming Global, Inc., Alpharetta, GA (US)

(72) Inventors: William M. Ortega, III, Lawrenceville, GA (US); Sean Hunczak, Cumming, GA (US); Richard Oesterreicher, Alpharetta, GA (US); Craig Murphy, Suwanee, GA (US)

(73) Assignee: Streaming Global, Inc., Alpharetta, GA (US)

( * ) Notice: Subject to any disclaimer, the term of this patent is extended or adjusted under 35 U.S.C. 154(b) by 0 days.

(21) Appl. No.: 18/175,462

(22) Filed: Feb. 27, 2023

(65) Prior Publication Data

US 2023/0291944 A1 Sep. 14, 2023

Related U.S. Application Data

(60) Provisional application No. 63/324,823, filed on Mar. 29, 2022, provisional application No. 63/316,524, filed on Mar. 4, 2022, provisional application No. 63/315,596, filed on Mar. 2, 2022.

(51) Int. Cl.
*H04N 21/2387* (2011.01)
*H04N 21/234* (2011.01)
*H04N 21/44* (2011.01)

(52) U.S. Cl.
CPC ....... *H04N 21/2387* (2013.01); *H04N 21/234* (2013.01); *H04N 21/44004* (2013.01)

(58) Field of Classification Search
CPC ............. H04N 21/2387; H04N 21/234; H04N 21/44004
See application file for complete search history.

(56) References Cited

U.S. PATENT DOCUMENTS

| | | | | |
|---|---|---|---|---|
| 10,484,446 | B1* | 11/2019 | Waggoner | ............... H04L 65/80 |
| 10,863,211 | B1* | 12/2020 | Wu | ....................... H04N 21/236 |
| 2010/0235528 | A1* | 9/2010 | Bocharov | ............. H04L 67/568 |
| | | | | 709/248 |
| 2011/0173345 | A1* | 7/2011 | Knox | .................... H04L 67/568 |
| | | | | 709/246 |

(Continued)

FOREIGN PATENT DOCUMENTS

WO WO-2019024851 A1 * 2/2019 ........... H04L 65/602

*Primary Examiner* — James R Sheleheda
(74) *Attorney, Agent, or Firm* — BEKIARES ELIEZER LLP

(57) ABSTRACT

The platform is directed to various aspects of content transmission. The platform causes a viewing device to receive fragment-level metadata associated with a first fragment of content. The platform receives a request for a second fragment of the content, immediately subsequent to the first fragment of the content. The platform determines that the second fragment of the content is not stored at a content storage device at a time of receiving the request, and that the second fragment of the content is expected to be stored at the content storage device within a defined time period. Responsive to these determinations, the platform holds the received request for the defined time period. The platform determines, prior to expiration of the defined time period, that the second fragment of the content is stored at the content storage device, and transmits the second fragment of the content to the viewing device.

18 Claims, 5 Drawing Sheets

(56) References Cited

U.S. PATENT DOCUMENTS

2013/0191489 A1\* 7/2013 Swaminathan ....... H04L 65/762
  709/213
2016/0337426 A1\* 11/2016 Shribman ............. H04L 65/612

\* cited by examiner

CONTENT DELIVERY PLATFORM

RELATED APPLICATIONS

Under provisions of 35 U.S.C. § 119(e), the Applicant claims benefit of U.S. Provisional Application No. 63/315,596 filed on Mar. 2, 2022, U.S. Provisional Application No. 63/316,524 filed on Mar. 4, 2022, and U.S. Provisional Application No. 63/324,823 filed on Mar. 29, 2022, and having inventors in common, which are incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to streaming delivery of content.

BACKGROUND

On-demand video streaming of content (e.g., video and/or audio content), such as live streaming, linear streaming, or on-demand playback, is often presented to a user via HTTP Live Streaming (HLS) protocol. The HLS protocol specifies that a large piece of content is broken up into small fragments (also referred to as segments) with each fragment having a length in the range of 2-12 seconds. Accordingly, for example, a video with a length of two-hours (7200 seconds) may be broken up into 720 fragments, with each fragment having a length of 10 seconds.

When a user wishes to view content (e.g., for a live stream or linear program), the user initiates a web transaction to download a manifest file associated with the desired content. The manifest file may include metadata and a link to each individual fragment. A Viewing device may parse the manifest file, and may initiate a download of fragments as needed. Typically, during a live stream, fragments are added to the manifest file following generation of fragment-metadata for the associated fragment. The fragment-level metadata generally includes the entirety of the manifest file, which may include thousands of lines of text that must be transferred over a network and parsed by the viewing device.

Typically, when a user initiates a transaction to begin viewing a content item, a viewing device builds a content buffer by retrieving a current fragment, waiting for one or more subsequent fragments to become available, and retrieving the one or more subsequent fragments. This buffer can help to reduce playback issues caused by slow or unstable internet connections, but creating the buffer leads to a delay in beginning playback of the content (e.g., an increase in "time to first frame").

Brief Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In some embodiments, the on-demand content delivery platform may reduce network traffic by eliminating fragment-level metadata transmissions for on-demand streaming delivery of fragmented content. The platform may include a content packager that packages a media asset (e.g., content, such as video and/or audio content) into a plurality of fragments for on-demand distribution to a viewing device. The content packager may provide, to an intermediary device, a starting index and a file name for the media asset. A viewing device can use the provided file name and starting index to retrieve an initial fragment of the media asset, and can calculate prior and/or subsequent indexes to retrieve additional fragments without receiving metadata or manifest files associated with the additional fragments. In embodiments, the content packager may optionally provide an ending index associated with a last fragment of the media asset. The viewing device may request a fragment associated with any valid index (e.g., any index corresponding to a fragment of the content), and/or effect "trick mode" playback (e.g., implementing operations such as pause, seek, rewind, etc.).

The content delivery platform may improve response times (e.g., time from initiating a viewing transaction to beginning playback) by requesting data before the data is made available. When the metadata arrives signaling that new media data (e.g., a new fragment) is available, the new data will already be in the process of transmitting to the viewer, and possibly have already arrived at the viewer. This may help to eliminate the delay associated with sending the data request to the storage apparatus after metadata is received.

In aspects, the platform is directed to a system, method, or software for performing operations related to content delivery without fragment-level metadata. The platform causes a viewing device to receive fragment-level metadata associated with a first fragment of content. The platform receives a request for a second fragment of the content, immediately subsequent to the first fragment of the content. The platform determines that the second fragment of the content is not stored at a content storage device at a time of receiving the request, and that the second fragment of the content is expected to be stored at the content storage device within a defined time period. Responsive to these determinations, the platform holds the received request for the defined time period. The platform determines, prior to expiration of the defined time period, that the second fragment of the content is stored at the content storage device, and transmits the second fragment of the content to the viewing device. In a first aspect, the platform is directed to a system for content transmission.

In aspects, the platform is directed to a system, method, or software for performing operations related to content delivery including pre-fetching. The platform may cause a viewing device to receive fragment-level metadata associated with a first fragment of content. The platform may receive, from the viewing device, a request for a second fragment of the content, the second fragment of the content being immediately subsequent to the first fragment of the content. The platform determines that the second fragment of the content is not stored at a content storage device at a time of receiving the request, and that the content is expected to be stored at the content storage device within a defined time period. Responsive to these determinations, the platform may hold the received request for the defined time period. The platform may determine, prior to expiration of the defined time period, that the second fragment of the content is stored at the content storage device, and may transmit the second fragment of the content to the viewing device.

In some embodiments, the content delivery platform may receive a request for a particular streaming content item. A viewing device may create a buffered output for the requested content item by fetching a current content fragment as well as one or more previous content fragments. This can save a large amount of start-up time compared with waiting for new data to become available to buffer. The buffered output additionally helps the viewing device maintain connection reliability while minimizing an amount of time to display a first frame of the particular content item and reducing a delay typically associated with buffering.

In aspects, the platform is directed to a system, method, or software for performing operations related to content delivery including post-fetching. The platform may receive, at a viewing device, metadata associated with a first fragment of content. The platform may transmit, from the viewing device to the content storage device, a first request for the first fragment of the content and a second request for a second fragment of the content, the second fragment of the content immediately preceding the first fragment of the content. The platform may receive, at the viewing device, the first fragment of the content and the second fragment of the content, and process the first fragment of the content and the second fragment of the content.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
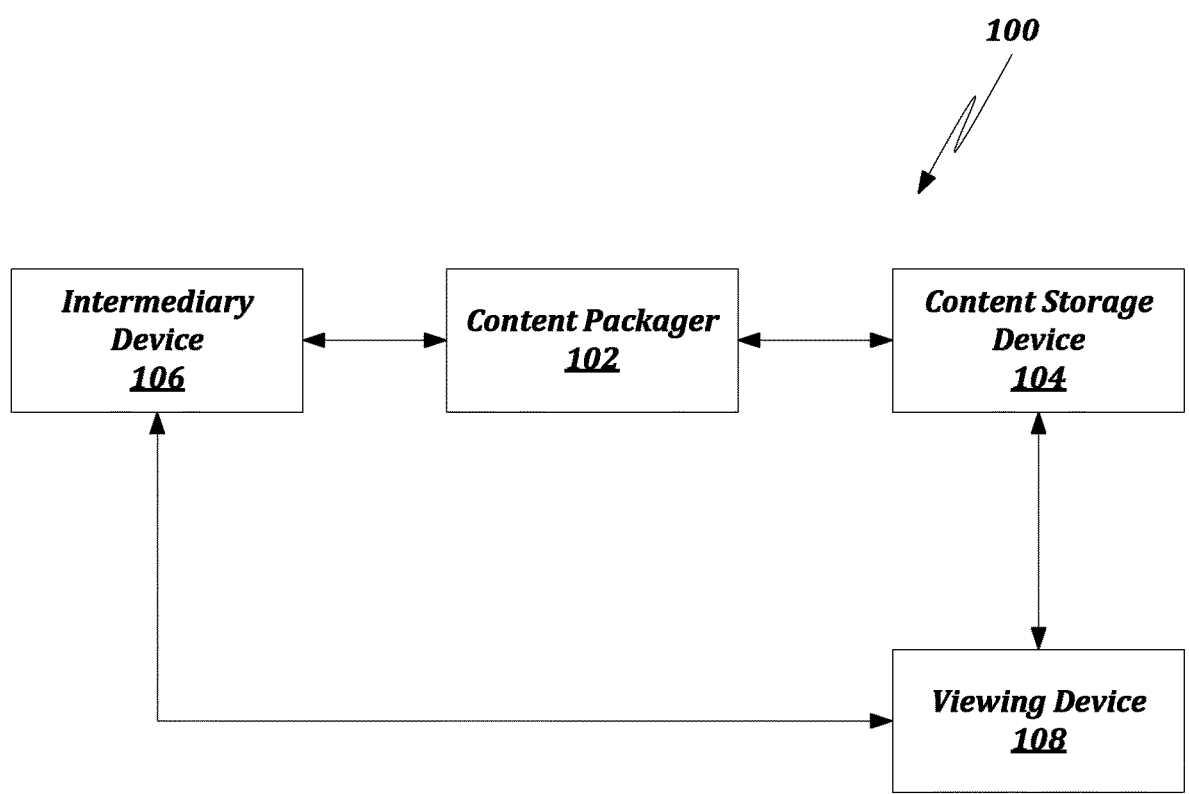
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of content delivery without delivering fragment-level metadata, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

When content (e.g., live content or on-demand content) is packaged for streaming delivery according to the HLS protocol, the content is divided into a plurality of fragments, with each fragment representing approximately 10 seconds of content. Each fragment is typically indexed by a metadata generator. The metadata generator may index each fragment using a regular indexing method. For example, a first fragment may have an index of "0001", a second fragment may have an index of "0002", and so on. In some embodiments, the indexes need not be incremental. That is, any calculation could be used to generate indexes, so long as a subsequent index and/or a prior index can be calculated from a known index.

In some embodiments, the content delivery platform may, responsive to the metadata generator completing indexing of a fragment of a content item that a user is viewing, send a metadata packet to a viewing device associated with the viewer. The metadata packet may include, among other information, the index of the newly indexed fragment.

Based on receipt of the metadata packet, the viewing device may submit, to a content storage device, a request to download one or more fragments having indexes that are prior in time order (e.g., less than) when compared to the newly indexed fragment. For example, if the metadata packet received from the metadata generator references a fragment having the index "0005" and the indexes are incremental, the viewing device may transmit a request to retrieve one or more of the fragments having the indexes "0001", "0002", "0003" and/or "0004". In particular, the viewing device may transmit a request to download one or more fragments that immediately precede the newly indexed fragment. In this way, the viewing device may quickly build a playback buffer for the content item.

The content packager may also transmit the fragment to the metadata generator. The metadata generator may generate metadata associated with the new fragment, and may transmit the metadata to the viewing device.

In some embodiments, the viewing device may refrain from initiating playback of the new fragment until metadata associated with the fragment is received. In other embodiments, the viewing device may permit playback of the fragment following completion of the immediately prior fragment.

In some embodiments, the content delivery platform described in the present application may reduce network traffic by eliminating fragment-level metadata transmissions for on-demand streaming delivery of fragmented content, and also by eliminating the HTTP round trip transaction associated with requesting and downloading the manifest file containing the metadata for all fragments. Moreover, because fragment-level metadata need not be transmitted, the platform may eliminate the metadata generator and may reduce the amount of network traffic created by the platform. Moreover, because the viewing device need not parse such a manifest file, the processing load on the viewing device is reduced.

The platform may include a content packager that packages a media asset (e.g., content, such as video and/or audio content) into a plurality of fragments for on-demand distribution to a viewing device. The content packager may provide, to an intermediary device, a starting index and a file name for the media asset. A viewing device can use the provided file name and starting index to retrieve an initial fragment of the media asset, and can calculate prior and/or subsequent indexes to retrieve additional fragments without receiving metadata associated with the additional fragments. In embodiments, the content packager may provide an ending index associated with a last fragment of the media asset. The viewing device may request a fragment associated with any valid index (e.g., any index corresponding to a fragment of the content), and/or effect "trick mode" playback (e.g., implementing operations such as pause, seek, rewind, etc.). In some embodiments, the viewing device may request a particular quality tier associated with the requested fragment, enabling adaptive bit rate (ABR) support for the content item.

Embodiments of the present disclosure may comprise methods, systems, and a computer readable medium comprising, but not limited to, at least one of the following:
 A. A Content Packager;
 B. A Content Storage Device;
 C. An Intermediary Device; and
 D. A Viewing Device.

Details with regards to each module is provided below. Although devices are disclosed with specific functionality, it should be understood that functionality may be shared between devices, with some functions split between devices, while other functions may be duplicated by the various devices. Furthermore, the name of each device should not be construed as limiting upon the functionality of the device. Moreover, each component disclosed within each device can be considered independently without the context of the other components within the same device or different devices. Each component may contain language defined in other portions of this specification. Each component disclosed for one device may be mixed with the functionality of another device. In the present disclosure, each component can be claimed on its own and/or interchangeably with other components of other modules.

Consistent with embodiments of the present disclosure, a method may be performed by at least one of the devices disclosed herein. The method may be embodied as, for example, but not limited to, computer instructions, which when executed, perform the method.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 illustrates one possible operating environment through which a platform consistent with embodiments of the present disclosure may be provided. By way of non-limiting example, a content delivery platform 100 may be hosted on, for example, a cloud computing service. In some embodiments, the platform 100 may be hosted on a computing device 500. A user may access platform 100 through a software application and/or hardware device. The software application may be embodied as, for example, but not limited to, a website, a web application, a desktop application, and a mobile application compatible with the computing device 500.

As shown in FIG. 1, the content delivery platform 100 may comprise a content packager 102, a content storage device 104, an intermediary device 106, and a viewing device 108.

Accordingly, embodiments of the present disclosure provide a software and hardware platform comprised of a distributed set of computing elements, including, but not limited to:

A. Content Packager

The content packager 102 may comprise hardware and/or software used to capture or receive content (e.g., video and/or audio content). The content packager 102 may further comprise hardware and/or software for dividing the content into a plurality of fragments.

In embodiments, the plurality of fragments into which the content is divided may comprise fragments compatible with distribution using the HLS protocol. For example, each fragment may have a length from a fraction of a second of up to and including a length of the content item. As an example, each fragment may typically have a length of up to about 12 seconds, and more particularly each fragment may have a length of 1-2 seconds. In embodiments, each fragment may have a name that includes a content identifier (e.g., an alphanumeric string identifying the content) and an index identifier (e.g., an alphanumeric string indicating an index of the particular fragment).

The content packager 102 may be in communication with the content storage device 104, such that a content fragment, once created, can be transmitted to the content storage device for short-term and/or long-term storage.

The content packager 102 may be in communication with the intermediary device 106. In embodiments, the content packager may be configured to generate and transmit, to the intermediary device 106, data associated with the content. The data may include content-level metadata including, for example, a content identifier, a starting fragment index associated with a first fragment of the content, and other media-specific data. In some embodiments, the data may include an ending fragment index associated with a final fragment of the content. In some embodiments, the data may include information corresponding to a plurality of quality tiers associated with the fragments. The quality tiers may be used for adaptive bit rate streaming of content items. In some embodiments, the data may include the actual content fragment. For example, the intermediary device 106 may serve as a metadata generator.

B. Content Storage Device

The content storage device 104 may comprise hardware and/or software used to store content fragments. The content storage device 104 may include one or more storage media configured for short-term and/or long-term storage of content. The content storage device 104 may store multiple content files, with each content file comprising a plurality of content fragments.

In embodiments, the content storage device 104 may receive each fragment from the content packager 102. Responsive to receiving each fragment, the content storage device 104 may store the content fragment, and may transmit a response to the content packager 102 indicating that the content fragment is successfully stored.

The content storage device may adhere to a particular naming convention for storage of each content fragment. In particular, each content fragment may be stored named according to the content identifier and the fragment index. In some embodiments, the content identifier and fragment index may be received from the content packager 102.

In embodiments, the content storage device is configured to receive requests for content, and to transmit the content to a device in response to receiving the request. In embodiments, the request for content may comprise a request for a particular fragment of the content, wherein the particular fragment may be requested based on an index associated with the particular fragment.

In some embodiments, responsive to a request for a particular fragment that is not stored at the content storage device 104, the content storage device may return an error (e.g., a file not found error). In other embodiments, responsive to a request for a particular fragment that is not stored at the content storage device 104, the content storage device may determine if the requested fragment is expected to be stored at the content storage device in the near future. For example, if the requested content fragment has a fragment index that is subsequent to (e.g., one higher than) the fragment index of the most recently received fragment and the content item is currently airing, the content storage device 104 may determine that the requested content fragment is expected to be stored at the content storage device in the near future. Responsive to such a determination, the content storage device 104 may hold the request open. The request may be held open for a set duration (e.g., approximately 10 seconds) to determine if the requested content item is received at the content storage device 104. If the requested fragment is stored in the content storage device 104 during the set duration, the content storage device may transmit the requested content fragment tot the requesting device, and may close the request. In embodiments, once the set duration elapses, if the requested content item still has not been stored at the content storage device 14, the content storage device may return an error (e.g., a file not found error).

In embodiments, the content storage device may be in communication with the content packager for receiving content fragments for storage.

In embodiments, the content storage device may be in communication with one or more viewing device 108 for receiving requests for distribution of content, and for distributing content in response to the received requests.

C. Intermediary Device

The intermediary device 106 may comprise hardware and/or software used to generate a uniform resource identifier (URI) associated with a content item. In some embodiments, generating the URI may identify data associated with the content item. For example, the URI may identify at least a portion of the data received from the content packager 102. The data identified in the URI may include, for example, a content identifier, a starting fragment index associated with a first fragment of the content, an ending fragment index associated with a final fragment of the content, and/or other media-specific data.

In embodiments, the intermediary device 106 may be in communication with the content packager 102 for receiving content data for URI creation.

In embodiments, the intermediary device 106 may make the generated URI available for inclusion on a web page, in a mobile app, or via other similar software accessible by one or more viewing devices 108 for determining available content items.

In some embodiments, the intermediary device 106 may serve as a metadata generator. That is, the intermediary device 106 may comprise hardware and/or software used to generate metadata associated with each content fragment. In some embodiments, generating metadata may comprise creating and/or modifying one or more manifest files associated with a content item to which the content fragment belongs. In embodiments, the metadata may comprise a metadata packet associated with the fragment. The metadata packet may comprise the manifest file.

In embodiments (e.g., where the intermediary device 106 serves as a metadata generator), the intermediary device may be in communication with the content packager 102 for receiving content fragments for metadata creation, and/or one or more viewing devices 108 for transmitting metadata packets associated with content to which the viewing device is subscribed. In some embodiments, a request for one or more fragments of a particular content item may be treated as a subscription to that content item.

D. Viewing Device

The viewing device 108 may comprise hardware and/or software used to process content. In embodiments, the viewing device may comprise one or more of a desktop computing device, a laptop computing device, a tablet, a smartphone, a smart tv, a tv set-top box, and/or any other computing device. In embodiments, the viewing device 108 may be configured to permit playback of a content file (e.g., playback of audio and/or video content). Alternatively or additionally, the viewing device 108 may be configured for analysis of the content item (e.g., cognitive processing of the packaged encoded content), and/or other devices for processing the content.

The viewing device 108 may access on a web page, a mobile app, or other similar software to determine a URI associated with an available content item. The viewing device 108 may transmit, to the content storage device 104, a request for the content identified in the URI. In embodiments, the request may include at least the content identifier and a valid fragment index. For example, a first request may include the file name and the identified starting fragment index; subsequent requests may calculate the subsequent fragment index according to a known pattern (e.g., an incrementing of the index). In some embodiments, the first request may include information associated with a quality tier of the fragment. The viewing device 108 may continue to issue the requests until the viewing device requests the fragment associated with the ending fragment index, or until a viewer interacting with the viewing device pauses, stops, or otherwise effects a change in playback of the content.

In some embodiments (e.g., when implementing "trick play" functionality such as pause, seek, rewind, etc.), one or more requests for content from the viewing device 108 may include a valid fragment index other than the starting fragment index. Responsive to the viewing device 108 resuming standard playback, the viewing device may resume issuing requests calculating the subsequent fragment index according to the known pattern.

In at least some embodiments, the viewing device 108 may receive metadata from the intermediary device 106 or another metadata generator. The received metadata may comprise fragment-level metadata related to a particular fragment of a content item to which the viewing device 108 is subscribed. For example, the metadata may comprise metadata related to a content item currently being displayed by the viewing device 108. In some embodiments, a request for one or more fragments of a particular content item may be treated as a subscription to that content item.

The viewing device 108 may transmit, to the content storage device 104, a request for content. In some embodiments, the request for the content may comprise a request for a particular content fragment. In some embodiments, the request for content may be based, at least in part, on metadata received from the metadata generator 106.

In embodiments, the viewing device 108 may request one or more particular content fragments based at least in part on received metadata (e.g., from the metadata generator 106). In particular, the viewing device may request multiple fragments of the content item to process, allowing the viewing device to quickly fill an output buffer with the requested content. For example, the viewing device 108 may request a content fragment having an index that matches the index specified in the received metadata (e.g., a most recently packaged content fragment).

In some embodiments, the viewing device 108 may also request one or more content fragments that represent content prior to the most recently packaged fragment (e.g., a fragment having an index prior to that of the most recently packaged fragment according to the set pattern). This may allow the viewing device 108 to fill an output buffer without waiting for additional fragments to be packaged.

In some embodiments, the viewing device 108 may also request one or more content fragment that represent content subsequent to the most recently packaged fragment (e.g., a fragment having an index subsequent to that of the most recently packaged fragment according to the set pattern). This may allow the viewing device 108 to receive the fragment as soon as it is available (e.g., as soon as the fragment is stored in the content storage device 104, without waiting for an intermediary device to generate metadata and transmit that metadata to the viewing device).

Responsive to each request, the viewing device 108 may receive a corresponding response from the content storage device 104. Responsive to the content storage device determining that the viewing device may receive the content, the response may include the content fragment. Alternatively, the response may include one or more status indications that indicates why the request was not fulfilled (e.g., HTTP 403 (FORBIDDEN), HTTP 404 (FILE NOT FOUND), etc.). After receiving the content fragment, the viewing device 108 may effect playback of the content fragment. For example, the viewing device 108 may cause display of the video and/or audio content encoded in the content fragment. In some embodiments, the viewing device 108 may cause the received content to be placed into an output buffer. The output buffer may comprise received frames of the content item, in the order they are to be displayed. In embodiments, the viewing device may refrain from initiating playback of the content until the output buffer includes a threshold amount of content.

III. Platform Operation

In embodiments, the content delivery platform 100 may be configured such that the viewing device requests a content fragment for playback. In embodiments, the content packager may store content fragments at a content storage device. The viewing device may request individual content fragments from the content storage device, such that the viewing device may create a playback buffer and effect playback of the content.

Embodiments of the present disclosure provide a hardware and software platform operative by a set of methods and computer-readable media comprising instructions configured to operate the aforementioned devices and computing elements in accordance with the methods. The following depicts an example of at least one method of a plurality of methods that may be performed by at least one of the aforementioned devices. Various hardware components may be used at the various stages of operations disclosed with reference to each device.

For example, although methods may be described to be performed by a single computing device, it should be understood that, in some embodiments, different operations may be performed by different networked elements in operative communication with the computing device. For example, at least one computing device 500 may be employed in the performance of some or all of the stages disclosed with regard to the methods. Similarly, an apparatus may be employed in the performance of some or all of the stages of the methods. As such, the apparatus may comprise at least those architectural components as found in computing device 500.

Furthermore, although the stages of the following example methods are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the example methods without altering or deterring from the fundamental scope of the depicted methods and systems disclosed herein. It should be understood that a computing device 500 may implement one or more of the example methods described herein.

A. Method of Content Fragment Delivery without Fragment-Level Metadata

In embodiments, the content delivery platform 100 may be configured such that the viewing device requests a content fragment without receiving metadata associated with that content fragment. In embodiments, the content packager may store content fragments at a content storage device. The content packager may further provide an intermediary device with content-level metadata associated with the content item. The intermediary device may generate a URI indicating a location of the content-level metadata. The viewing device, may use the content-level metadata to construct a request for the content item, beginning at a valid fragment. Thereafter, the viewing device may request one or more subsequent fragments until a final fragment is reached or a viewer pauses, stops, or otherwise interrupts the playback.

Consistent with embodiments of the present disclosure, a method may be performed by at least one of the aforementioned devices. The method may be embodied as, for example, but not limited to, computer instructions, which when executed, perform the method.

Figure 2:
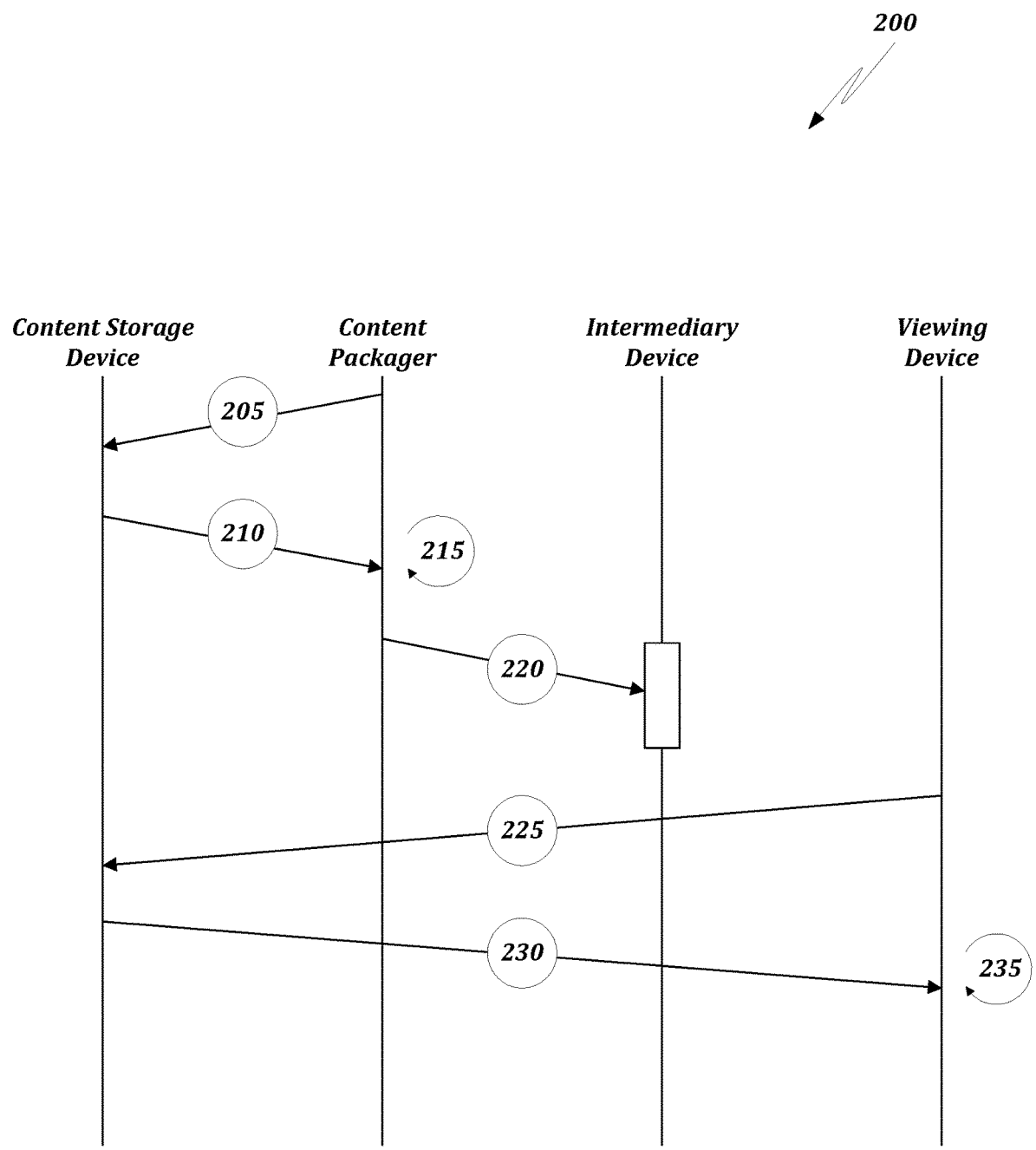
FIG. 2 is a data flow diagram of a method for providing content delivery without fragment-level metadata.

FIG. 2 is a data flow diagram illustrating the general stages involved in a method 200 consistent with an embodiment of the disclosure for making use of the content delivery platform 100 for delivery of content. Method 200 may be implemented using a computing device 500 and/or any other component associated with platform 100 as described in more detail below with respect to FIG. 5.

Method 200 may begin at stage 205, where a content packager may deliver a content fragment to a content storage device. Delivering the content fragment may include packaging content for streaming delivery to a viewing device. In embodiments, packaging the content may comprise, for example, creating a content fragment (e.g., by encoding, converting, and/or transcoding the content and dividing the content into one or more fragments) and delivering the content fragment to a content storage device.

In embodiments, the content fragment may comprise, for example, a subset of a video and/or audio content item. For example, the content fragment may have a duration of up to 12 seconds.

From stage 205, method 200 may advance to stage 210 where the content storage device may transmit, to the content packager, an indication that the fragment has been stored at the content storage device. Prior to sending the indication, the content storage device may store the received content fragment. The content storage device may store the content fragment in short-term and/or long-term storage, at one or more storage media managed by the content storage device. In embodiments, the content fragment may be stored according to a particular naming convention, based on at least a content identifier and a fragment index of the received content fragment.

Responsive to storage of the received content fragment, the content storage device may transmit, to the content packager, a response indicating successful storage of the content fragment.

In stage 215, the platform 100 may repeat steps 205 and 210 until all fragments have been packaged by the content packager, transmitted from the content packager to the content storage device, stored successfully at the content storage device, and corresponding acknowledgements transmitted from the content storage device to the content packager. In particular, the content packager may package fragments, adjusting the fragment index in a predefined pattern (e.g., incrementing the fragment index by one each iteration). The content packager may transmit, to the content storage device, each of the content fragments to the content storage device in turn. Once received, the content storage device may store the fragment and acknowledge successful storage of the fragment to the content packager.

In stage 220, the content packager may transmit, to an intermediary device, data associated with the content item. For example, the data may include content-level metadata such as a content identifier, a starting fragment index associated with a first fragment of the content, and other media-specific data. In some embodiments, the data may include an ending fragment index associated with a final fragment of the content.

The intermediary device may generate a URI associated with the content item. The URI may identify at least a portion of the data associated with the content item received from the content packager. For example, the URI may identify a web site storing the data and accessible by a web browser, in a mobile app, and/or via other similar software.

In stage 225, a viewing device may transmit, to the content storage device, a request for a content fragment. In embodiments, the viewing device may form the request based at least in part on the data stored at the URI. In some embodiments, the viewing device may obtain the URI from the intermediary device. For example, the viewing device may transmit a query to the intermediary device and receive, as a response, at least the created URI. In other embodiments, the viewing device may already know the created URI. For example, the URI may be provided to the viewing device during a periodic update to the viewing device, a firmware update to the viewing device, may be included in code stored at the viewing device, or the like.

For example, the viewing device may access the URI created by the intermediary device to determine at least a content identifier and a valid fragment index (e.g., the starting fragment index, or any index between the starting fragment index and the ending fragment index according to the predetermined pattern). The viewing device may request the fragment associated the fragment index, without receiving any metadata associated with that fragment.

In stage 230, responsive to the request from the viewing device received in stage 225, the content storage device may transmit the requested fragment to the viewing device. The viewing device may effect playback of the content fragment. For example, the viewing device may add the video and/or audio content to a playback buffer or otherwise cause display of the video and/or audio content encoded in the content fragment.

In stage 235, the platform may repeat stages 225 and 230 for one or more iterations. In particular, the viewing device may adjust the index of the requested fragment according to the set pattern with each iteration. In some embodiments, the platform may repeat stages 225 and 230 until the viewing device requests a fragment having an index matching the ending fragment index specified by the content packager, or until a viewer interacting with the viewing device causes the viewing device to pause, stop, or otherwise halt the playback of the content item. In this way, the viewing device may effect playback of a content item without receiving metadata associated with any of the content fragments. This may reduce the amount of network traffic generally. Moreover, eliminating the fragment-level metadata eliminates the need for a metadata generator. Still further, a lost metadata packet does not result in a playback error.

B. Method of Data Delivery with Post-Fetching

In embodiments, the content delivery platform 100 may be configured such that, responsive to a request from a viewer to start processing a particular content item, a viewing device may create a buffered output by fetching a current content fragment as well as one or more previous content fragments. This can save a large amount of start-up time compared with waiting for new data to become available to buffer. The buffered output additionally helps the viewing device maintain connection reliability while minimizing an amount of time to display a first frame of the particular content item and reducing a delay typically associated with buffering.

Figure 3:
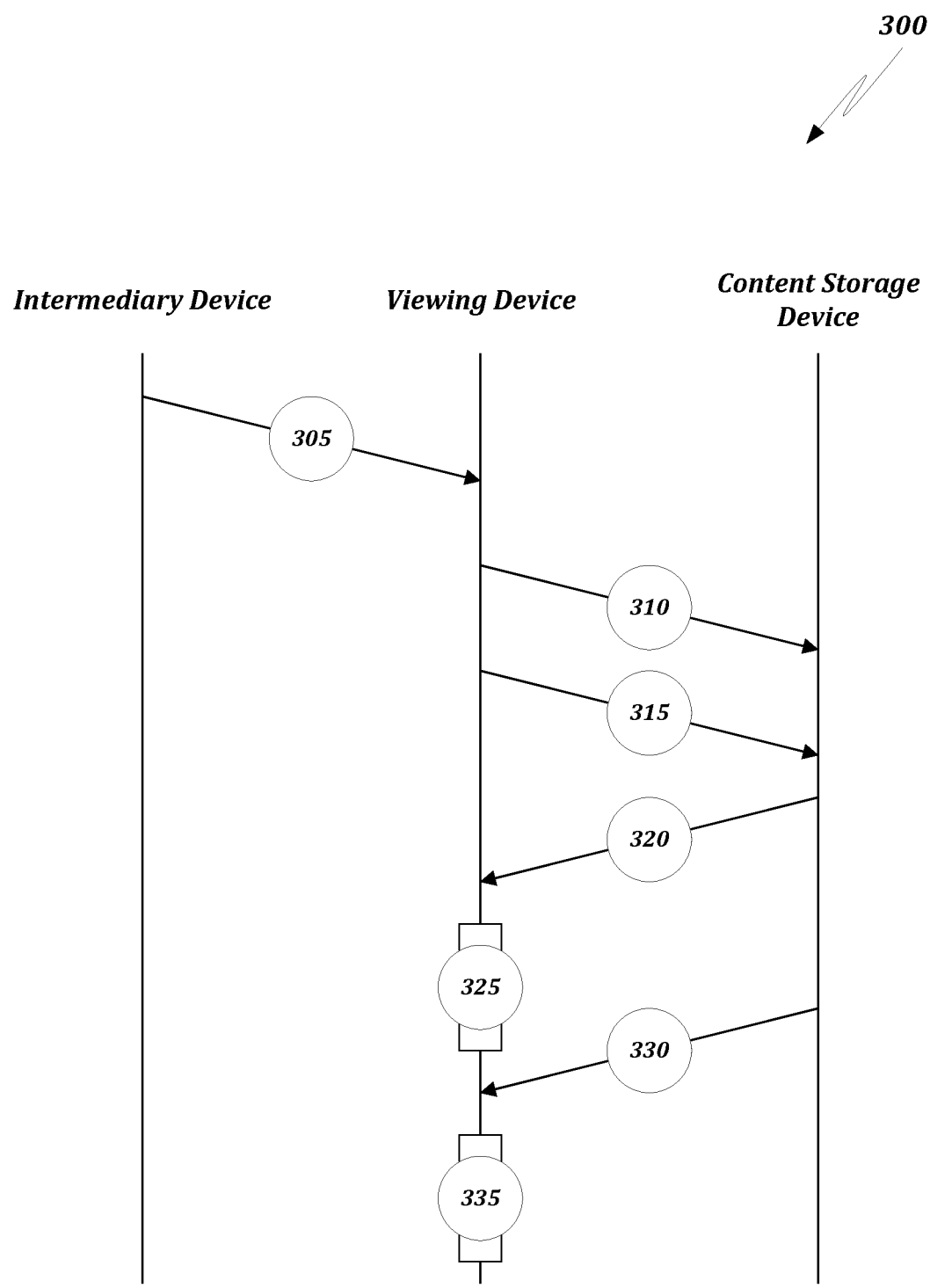
FIG. 3 is a data flow diagram of a method for providing data delivery with post-fetching.

FIG. 3 is a data flow diagram illustrating the general stages involved in a method 300 consistent with an embodiment of the disclosure for making use of the content delivery platform 100 (as shown in FIG. 1) for delivery of content with post-fetching. Method 300 may be implemented using a computing device 500 or any other component associated with platform 100 as described in more detail below with respect to FIG. 5.

Consistent with embodiments of the present disclosure, a method may be performed by at least one of the aforementioned devices. The method may be embodied as, for example, but not limited to, computer instructions, which when executed, perform the method.

Method 300 may begin at stage 305, where a metadata generator (e.g., metadata generator 106) may create metadata associated with a currently available content fragment. In some embodiments, the metadata packet may include a manifest file comprising metadata associated with each content fragment issued by a content packager for the associated content item. In embodiments, the currently available content fragment may be the fragment most recently released from a content packager (e.g., the content packager 102). The currently available content fragment may have an index of n. As a particular example, the content fragment may have an index of "0003". This may indicate that the content fragment is the third fragment issued by the content packager.

In embodiments, the metadata created by the metadata generator may comprise a metadata packet. The metadata packet may contain, among other things, a current available data index including at least the index of the currently available fragment.

The metadata generator may transmit the packet to one or more viewing devices (e.g., viewing device 108) subscribed to updates regarding the content. In embodiments, a device may be said to be subscribed to a particular data channel when it has registered with a device (e.g., the content storage device, and/or the metadata generator) to receive pushed data sent to a particular channel (e.g., data having a particular channel identifier, data received on a particular port, and/or the like). For example, a viewing device wishing to register with the metadata generator may transmit, to the metadata generator, a registration request including a URI at which the metadata generator may contact the viewing device and a channel identifier associated with the channel the viewing device is subscribing to.

In some embodiments, the metadata is received by the viewing device responsive to a request from the viewing device for the metadata. The request may be, for example, a subscription to updates related to the content item triggered by a user request for playback of the content item.

From stage 305, method 300 may advance to stage 310 where the viewing device transmit a request for a content fragment. For example, the viewing device may receive the metadata from the metadata generator, which may indicate an index (e.g., n) associated with the currently available content fragment. Based on the index of the currently available fragment, the viewing device may transmit, to a content storage device, the viewing device may calculate an index of the fragment the immediately precedes the currently available fragment. For example, if the fragment index is a n incrementing index, the viewing device may calculate the index of the immediately preceding fragment as n−1. The viewing device may transmit, to the content storage device, a request for the content fragment having an index of n−1. That is, the viewing device may transmit a request to the content storage device, for the fragment which comes BEFORE (e.g., immediately preceding) the data identified in the metadata packet. As a specific example, if metadata from the metadata generator identified the index "0005" and the pattern of the indexes is an incrementing pattern, the viewing device may transmit a request for a content fragment having an index of "0004".

In some embodiments, the viewing device may request a plurality of preceding content fragments at stage 310. For example, where the received metadata indicates the index of the current content fragment to be n and where the index pattern is an incrementing pattern, the viewing device may calculate a plurality of indexes that precede the index n (e.g., n−1, n−2, n−3, and n−4), and may request the content fragments associated with the calculated indexes. In some embodiments, the viewing device may request all content fragments created prior to (e.g., having an index previous to) the current content fragment.

In stage 315, the viewing device may transmit a request for the current content fragment. For example, the metadata received from the metadata generator may indicate the index (e.g., n) associated with the currently available content fragment. The viewing device may transmit, to the content storage device, a request for the content fragment having the index of n.

In some embodiments, the viewing device may transmit the request for the current content fragment immediately after transmitting the one or more requests for a preceding content fragment in stage 310. That is, the viewing device may not wait for any response to the one or more requests for a preceding content fragment transmitted in stage 310 before transmitting the request for the current content fragment in stage 315. In other embodiments, the viewing device may delay transmission of the request for the current content fragment until at least one of the one or more preceding content fragments is received from the content storage device.

In stage 320, the content storage device may receive the one or more requests for previous content fragments from the viewing device. Responsive to receiving the one or more requests, the content storage device may transmit, to the viewing device, the requested one or more content fragments. For example: if the received request included a request for a content fragment having an index of "0002", the content storage device may transmit the fragment having the index "0002" to the viewing device.

In stage 325, the viewing device may receive the one or more previous content fragments from the content storage device. In response to receipt of the one or more preceding content fragments, the viewing device may process the received one or more preceding content fragments. For example, processing the received one or more preceding content fragments may include building a playback buffer using the content in the one or more preceding content fragments. Once the playback buffer includes a particular amount of content (e.g., once the length of playback for the content stored in the playback buffer exceeds a threshold length), the viewing device may begin playback of the content from the playback buffer. For example, the playback buffer may include an amount of content corresponding to a particular playback duration (e.g., 15 seconds, 30 seconds, 60 seconds, 2 minutes, etc.). In some embodiments, playback of the content may continue even if the buffer size falls below the threshold length.

In stage 330, the content storage device may receive the request for the current content fragment from the viewing device. Responsive to receiving the request, the content storage device may transmit, to the viewing device, the requested current content fragment. For example: if the current data index is "0005", the received request may be a request for a content fragment having an index of "0005", and the content storage device may transmit the fragment having the index "0005" to the viewing device.

In stage 335, the viewing device may receive the current content fragment from the content storage device. In response to receipt of the current content fragment, the viewing device may process the current content fragment. For example, processing the current content fragment may include adding the current content fragment to the playback buffer for playback of the content.

In this way, the playback buffer can be filled with content faster than if the viewing device were to wait for new fragments to be issued by a content packager following the user request for playback of the content. Thus, the "time to first frame" may be reduced, while still maintaining a full playback buffer.

C. Method of Data Delivery with Pre-Fetching

In embodiments, the content delivery platform 100 may be configured such that the viewing device requests a content fragment prior to receiving metadata indicating that the content fragment exists. For example, responsive to receiving metadata associated with a content fragment having an index n, the viewing device may request a content fragment having an index n+1. In embodiments, the content storage device from which the viewing device requests the content fragment may determine that the fragment is not present at the content storage device. The content storage device may retain the request in an open state for a period of time. Responsive to delivery of the content fragment from a content packager, the content delivery device may transfer the requested fragment to the viewing device, thus fulfilling the request.

Embodiments of the present disclosure provide a hardware and software platform operative by a set of methods and computer-readable media comprising instructions configured to operate the aforementioned devices and computing elements in accordance with the methods. The following depicts an example of at least one method of a plurality of methods that may be performed by at least one of the aforementioned devices. Various hardware components may be used at the various stages of operations disclosed with reference to each device.

Consistent with embodiments of the present disclosure, a method may be performed by at least one of the aforementioned devices. The method may be embodied as, for example, but not limited to, computer instructions, which when executed, perform the method.

Figure 4:
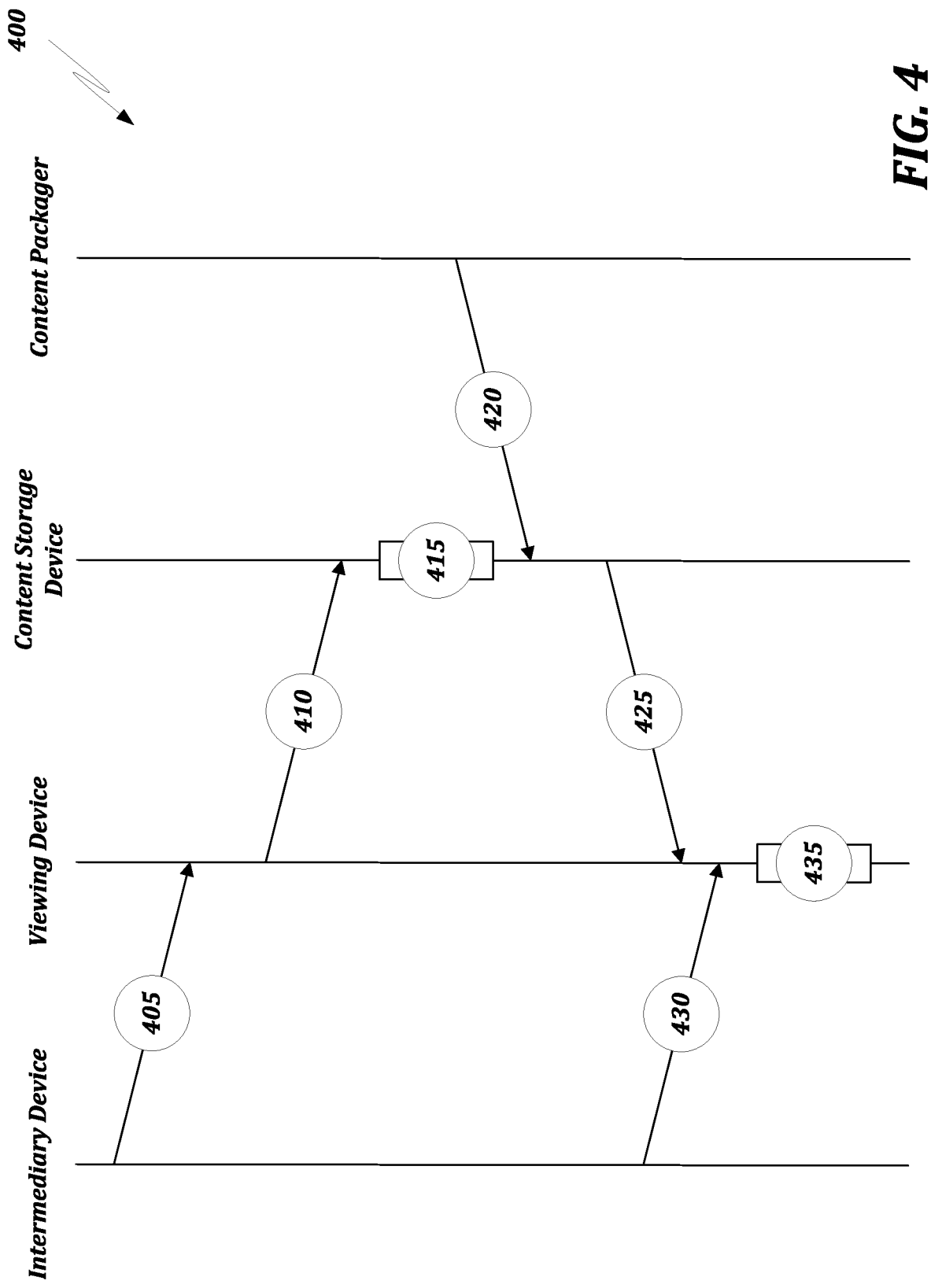
FIG. 4 is a data flow diagram of a method for providing data delivery with pre-fetching.

FIG. 4 is a data flow diagram illustrating the general stages involved in a method 400 consistent with an embodiment of the disclosure for making use of the content delivery platform 100 for delivery of content with pre-fetching. Method 400 may be implemented using a computing device 500 or any other component associated with platform 100 as described in more detail below with respect to FIG. 5.

Method 400 may begin at stage 405, where a metadata generator (e.g., the intermediary device 106 acting as a metadata generator) may create metadata associated with a currently available content fragment. In embodiments, the currently available content fragment may be the fragment most recently released from a content packager (e.g., the content packager 102). The currently available fragment may have an index of n. As a particular example, the content fragment may have an index of "0003". This may indicate that the content fragment is the third fragment issued by the content packager.

In embodiments, the metadata created by the metadata generator may comprise a metadata packet. The metadata packet may contain, among other things, a current available data index including at least the index of the currently available fragment.

The metadata generator may transmit the packet to one or more viewing devices (e.g., viewing device 108) subscribed to updates regarding the content. In some embodiments, a request for one or more fragments of a particular content item may be treated as a subscription to that content item.

From stage 405, method 400 may advance to stage 410 where the viewing device transmits a request for a content fragment. For example, the viewing device may receive the metadata from the metadata generator, and may process the received metadata to determine the index (e.g., n) associated with the currently available content fragment. The viewing device may calculate an index for a subsequent content fragment (e.g., a content fragment following the currently available content fragment) based on the index of the currently available fragment and a set pattern of fragment indexes. For example, if the currently available fragment has an index of n and the set pattern of fragment indexes is incrementing, the index of the subsequent fragment may be calculated as n+1. The viewing device may transmit, to a content storage device, a request for a content fragment having an index of n+1. That is, the viewing device may transmit a request, to a content storage device, for the fragment which will come AFTER (e.g., immediately subsequent to) the fragment identified in the metadata packet received at the viewing device. For example, if metadata from the metadata generator identified the index "0003" and the set pattern is an incrementing pattern, the viewing device may request a content fragment having an index of "0004".

In stage 415, the platform 100 may receive the content fragment request from the viewer at a content storage device (e.g., the content storage device 102). In embodiments, the content storage device may determine that the requested content fragment is not stored in the content storage device. For example, the content storage device may determine that the requested content fragment may not be issued by the content packager.

Responsive to determining that the requested fragment is not currently stored at the content storage device 104, the platform 100 may determine if the requested fragment is expected to be stored at the content storage device (e.g., if the fragment is currently being generated upstream from the content storage device). If the fragment is expected to be stored at the content storage device, the content storage device may hold the request open, and respond to the request once the requested fragment is available. Holding the request open effectively reduces network traffic, by eliminating a need for a consuming device (e.g., the viewing device 108) to resubmit the request for the fragment additional times if it wasn't available at the time of the first request. Additional benefits of holding the request open include (but are not limited to) reducing the wait time for more than one network round trip for additional requests, and reducing the wait time for the next request to arrive before responding/delivering the newly available file or data. In embodiments, holding the request open when a fragment is expected to be delivered may result in a significant speed boost for streaming file, data, and media delivery while efficiently reducing required network traffic.

In stage 420, the content packager may transmit a new content fragment to the content storage device. The new content fragment may be a content fragment having the next subsequent index, and may be a content fragment that is configured to immediately follow a prior content fragment. In embodiments, the index of the next content fragment may match the index included in the content fragment request received from the viewing device.

In stage 425, the content storage device receives the content fragment from the content packager and sends the content fragment to the viewing device in response to determining that the viewing device requested the content fragment. For example, the content storage device may receive the content fragment from the content packager. The content storage device may store the content fragment in a data storage device.

In embodiments, the content storage device may determine that the index of the received content fragment matches the index of the received fragment request from the viewing device, which has been held open. Responsive to this determination, the content storage device may transmit the received content fragment to the viewing device that requested the content fragment.

In stage 430, the metadata generator creates metadata associated with the new content fragment issued by the content packager. In some embodiments, the content packager may transmit the new content fragment to the metadata generator for metadata creation. For example, the content packager may transmit the content fragment to the metadata generator in response to an indication, from the content storage device, that the content fragment was stored successfully. Thus, the creation of metadata in stage 430 may occur substantially contemporaneously with transmission of the new content fragment to the viewing device in stage 425.

In embodiments, the metadata may comprise a metadata packet associated with at least the new content fragment. The metadata packet may include, for example, information such as a content identifier associated with the content item and/or a content fragment index associated with the new content fragment. For example, the metadata generator may receive a content fragment associated with a particular content identifier and having a particular content fragment index. The metadata generator may create a metadata packet including the content identifier and the new current available data index.

After creation of the metadata packet, the metadata packet may be transmitted to one or more viewing devices. In embodiments, the one or more viewing devices may comprise all viewing devices subscribed to receive updates regarding the particular content item.

In stage 435, the viewing device processes the data in the response from the content storage device. In some embodiments, processing the data may comprise effecting playback of the content fragment received from the storage device. In some embodiments, the processing of the content fragment may require that the viewing device has received the metadata packet associated with the content fragment. In other embodiments, processing the fragment may require only that processing of the immediately preceding fragment is complete. Thus, the viewing device may process the content fragment even prior to receiving the metadata associated therewith.

Embodiments of the present disclosure provide a hardware and software platform operative as a distributed system of modules and computing elements.

Platform 100 may be embodied as, for example, but not be limited to, a website, a web application, a desktop application, backend application, and a mobile application compatible with a computing device 500. The computing device 500 may comprise, but not be limited to the following:

A mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/ iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be a rack mounted server, a blade server, an appliance-based computing resource an accelerator card (such as those manufactured by Xilinx or Intel), a workstation, an industrial device, a raspberry pi, a desktop, or an embedded device;

A purpose-built computing device, wherein the purpose-built computing device comprises hardware and/or software custom designed for a specific deployment environment and/or usage scenario, such as a computing device for use in a satellite or other communication device.

Platform 100 may be hosted on a centralized server or a cloud computing service. Although method 200 has been described to be performed by a computing device 500, it should be understood that, in some embodiments, different operations may be performed by a plurality of the computing devices 500 in operative communication at least one network.

Embodiments of the present disclosure may comprise a system having a central processing unit (CPU) 520, a bus 530, a memory unit 540, a power supply unit (PSU) 550, and one or more Input/Output (I/O) units. The CPU 520 coupled to the memory unit 540 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages any method disclosed herein.

Figure 5:
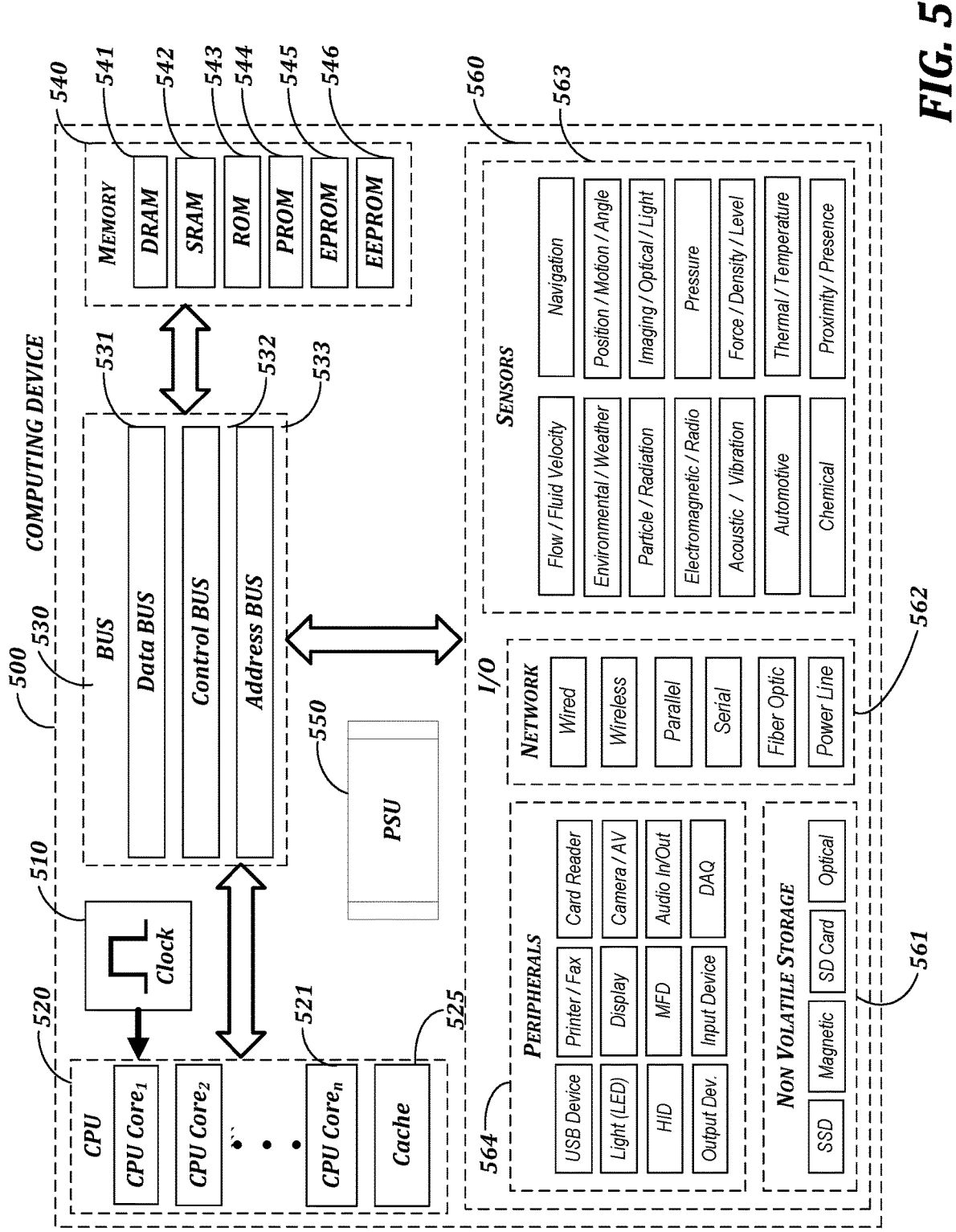
FIG. 5 is a block diagram of a system including a computing device for performing the methods of FIGS. 2-4.

FIG. 5 is a block diagram of a system including computing device 500. Consistent with an embodiment of the disclosure, the aforementioned CPU 520, the bus 530, the memory unit 540, a PSU 550, and the plurality of I/O units 560 may be implemented in a computing device, such as computing device 500 of FIG. 5. Any suitable combination of hardware, software, or firmware may be used to implement the aforementioned units. For example, the CPU 520, the bus 530, and the memory unit 540 may be implemented with computing device 500 or any of other computing devices 500, in combination with computing device 500. The aforementioned system, device, and components are examples and other systems, devices, and components may comprise the aforementioned CPU 520, the bus 530, the memory unit 540, consistent with embodiments of the disclosure.

At least one computing device 500 may be embodied as any of the computing elements illustrated in all of the attached figures, including the content packager, the metadata generator, the content storage device, and/or the viewing device. A computing device 500 does not need to be electronic, nor even have a CPU 520, nor bus 530, nor memory unit 540. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 540, at least one PSU 550, and at least one I/O 560 module, wherein I/O module may be comprised of, but not limited to a non-volatile storage sub-module 561, a communication sub-module 562, a sensors sub-module 563, and a peripherals sub-module 564.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 540 or input/output 560). Some embodiments of the clock 510 may include dynamic frequency change, where, the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 540, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
· Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, know to the person having ordinary skill in the art as primary storage or memory 540. The memory 540 operates at high speed, distinguishing it from the non-volatile storage sub-module 561, which may be referred to as secondary or tertiary storage, which provides slow-to-access information but offers higher capacities at lower cost. The contents contained in memory 540, may be transferred to secondary storage via techniques such as, but not limited to, virtual memory and swap. The memory 540 may be associated with addressable semiconductor memory, such as integrated circuits consisting of silicon-based transistors, used for example as primary storage but also other purposes in the computing device 500. The memory 540 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 541, Static Random-Access Memory (SRAM) 542, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 543, Programmable ROM (PROM) 544, Erasable PROM (EPROM) 545, Electrically Erasable PROM (EEPROM) 546 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 564. The plurality of hardware is used by the at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using intermediate area in the memory 540. The non-volatile storage sub-module 561 does not lose data when power is removed and may be two orders of magnitude less costly than storage used in memory module, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD+RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be said to be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11

Wi-Fi, Bluetooth, NFC, free-space optical communications, terrestrial microwave, and Infrared (IR) communications. Wherein cellular systems embody technologies such as, but not limited to, 3G,4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 564 comprises ancillary devices uses to put information into and get information out of the computing device 500. There are 3 categories of devices comprising the peripheral sub-module 564, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 564:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

IV. Aspects

The following discloses various Aspects of the present disclosure. The various Aspects are not to be construed as patent claims unless the language of the Aspect appears as a patent claim. The Aspects describe various non-limiting embodiments of the present disclosure.

Aspect 1. A non-transitory computer-readable medium comprising instructions which, when executed by one or more hardware processors, cause execution of operations comprising: receiving, at a viewing device configured to effect playback of content, content-level metadata associated with a content item; transmitting, from the viewing device to a content storage device, a first request for a first fragment of the content; receiving, responsive to the first request, the first fragment of content; responsive to receiving the first fragment of the content, transmitting, from the viewing device to the content storage device, a second request for a second fragment of the content, the second fragment of the content being immediately subsequent to the first fragment of the content; and receiving, responsive to the second request, the second fragment of the content, wherein the second fragment of the content is received at the viewing device from the content storage device.

Aspect 2. The non-transitory computer-readable medium of any previous aspect, wherein the content-level metadata comprises at least a content identifier and an initial fragment index Aspect 3. The non-transitory computer-readable medium of any previous aspect, wherein the viewing device does not receive any fragment metadata related to the second fragment of the content prior to requesting the second content fragment.

Aspect 4. The non-transitory computer-readable medium of any previous aspect, the steps further comprising: processing the first fragment of content, and processing the second fragment of content.

Aspect 5. The non-transitory computer-readable medium of any previous aspect, wherein processing the first fragment of the content comprises one or more of: decoding the first fragment of the content; adding the decoded content stored in the first fragment to a playback buffer for playback, or performing a data analysis of the decoded first fragment of content.

Aspect 6. The non-transitory computer-readable medium of any previous aspect, wherein the request for the second fragment of content is formed based on a known rule for determining fragment indexes of the fragments of the content.

Aspect 7. The non-transitory computer-readable medium of any previous aspect, further comprising, responsive to both receiving the second fragment of content from the content storage device and receiving a trick play request from a user: transmitting, from the viewing device to the content storage device, a third request for a third fragment of the content, wherein the third fragment of the content is not adjacent to the second fragment of the content, and, wherein the viewing device does not receive any fragment metadata related to the third fragment of the content prior to requesting the third fragment of the content; and receiving, responsive to the second request, the third fragment of the content, wherein the second fragment of the content is received at the viewing device from the content storage device.

Aspect 8. A method comprising: receiving, at a viewing device configured to effect playback of content, content-level metadata associated with a content item; transmitting, from the viewing device to a content storage device, a first request for a first fragment of the content; receiving, responsive to the first request, the first fragment of content; responsive to receiving the first fragment of the content, transmitting, from the viewing device to the content storage device, a second request for a second fragment of the content, the second fragment of the content being immediately subsequent to the first fragment of the content; and receiving, responsive to the second request, the second fragment of the content, wherein the second fragment of the content is received at the viewing device from the content storage device.

Aspect 9. The method of any previous aspect, wherein the content-level metadata comprises at least a content identifier and an initial fragment index Aspect 10. The method of any previous aspect, wherein the viewing device does not receive any fragment metadata related to the second fragment of the content prior to requesting the second content fragment.

Aspect 11. The method of any previous aspect, further comprising: processing the first fragment of the content, and processing the second fragment of the content.

Aspect 12. The method of any previous aspect, wherein processing the first fragment of the content comprises one or more of: decoding the first fragment of the content; adding the decoded content stored in the first fragment to a playback buffer for playback, or performing a data analysis of the decoded first fragment of content.

Aspect 13. The method of any previous aspect, wherein the request for the second fragment of content is formed based on a known rule for determining fragment indexes of the fragments of the content.

Aspect 14. The method of any previous aspect, further comprising, responsive to both receiving the second fragment of content from the content storage device and receiving a trick play request from a user: transmitting, from the viewing device to the content storage device, a third request for a third fragment of the content, wherein the third fragment of the content is not adjacent to the second fragment of the content, and, wherein the viewing device does not receive any fragment metadata related to the third fragment of the content prior to requesting the third fragment of the content; and receiving, responsive to the second request, the third fragment of the content, wherein the second fragment of the content is received at the viewing device from the content storage device.

Aspect 15. A system comprising: at least one device including a hardware processor; the system being configured to perform operations comprising: receiving content-level metadata associated with a content item; transmitting, to a content storage device, a first request for a first fragment of the content; receiving, responsive to the first request, the first fragment of content; responsive to receiving the first fragment of the content, transmitting, to the content storage device, a second request for a second fragment of the content, the second fragment of the content being immediately subsequent to the first fragment of the content; and receiving, responsive to the second request, the second fragment of the content, wherein the second fragment of the content is received at the viewing device from the content storage device.

Aspect 16. The system of any previous aspect, wherein the content-level metadata comprises at least a content identifier and an initial fragment index Aspect 17. The system of any previous aspect, wherein the at least one device does not receive any fragment metadata related to the second fragment of the content prior to requesting the second content fragment.

Aspect 18. The system of any previous aspect, the operations further comprising: processing the first fragment of content, and processing the second fragment of content.

Aspect 19. The system of any previous aspect, wherein processing the first fragment of the content comprises one or more of: decoding the first fragment of the content; adding the decoded content stored in the first fragment to a playback buffer for playback, or performing a data analysis of the decoded first fragment of content.

Aspect 20. The system of any previous aspect, wherein the request for the second fragment of content is formed based on a known rule for determining fragment indexes of the fragments of the content.

Aspect 21. A non-transitory computer-readable medium comprising instructions which, when executed by one or more hardware processors, cause execution of operations comprising: causing a viewing device to receive fragment-level metadata associated with a first fragment of content; receiving, from the viewing device, a request for a second fragment of the content, the second fragment of the content being immediately subsequent to the first fragment of the content; determining that the second fragment of the content is not stored at a content storage device at a time of receiving the request; determining that the second fragment of the content is expected to be stored at the content storage device within a defined time period; responsive to the determination that the second fragment of the content is not stored at the content storage device and the determination that the second fragment of the content is expected to be stored at the content storage device within the defined time period, holding the received request for the defined time period; determining, prior to expiration of the defined time period, that the second fragment of the content is stored at the content storage device; and transmitting the second fragment of the content to the viewing device.

Aspect 22. The non-transitory computer-readable medium of any previous aspect, the operations further comprising: subsequent to transmitting the second fragment to the viewing device, causing the viewing device to receive fragment-level metadata associated with the second fragment of the content.

Aspect 23. The non-transitory computer-readable medium of any previous aspect, the operations further comprising: causing the viewing device to process the second fragment of the content, responsive to the viewing device receiving the fragment-level metadata associated with the second fragment of the content.

Aspect 24. The non-transitory computer-readable medium of any previous aspect, wherein processing the second fragment of the content comprises one or more of: decoding the second fragment of the content; adding the decoded content stored in the second fragment to a playback buffer for playback, or performing a data analysis of the decoded second fragment of content.

Aspect 25. The non-transitory computer-readable medium of any previous aspect, the operations further comprising: causing the viewing device to process the second fragment of the content, responsive to the viewing device receiving the second fragment of the content, wherein the viewing device processes the second fragment of content without receiving fragment-level metadata associated with the second fragment of the content.

Aspect 26. The non-transitory computer-readable medium of any previous aspect, the operations further comprising: causing a second viewing device to receive fragment-level metadata associated with a third fragment of content; receiving, from the viewing device, a request for a fourth fragment of the content, the fourth fragment of the content being immediately subsequent to the third fragment of the content; determining that the fourth fragment of the content is not stored at a content storage device at a time of receiving the request; determining that the fourth fragment of the content is not expected to be stored at the content storage device within the defined time period; and responsive to the determination that the fourth fragment of the content is not stored at the content storage device and the determination that the fourth fragment of the content is not expected to be stored at the content storage device within the defined time period, transmitting, to the second viewing device, an error message indicating that the fourth fragment is not available.

Aspect 27. The non-transitory computer-readable medium of any previous aspect, the operations further comprising: causing a third viewing device to receive fragment-level metadata associated with a fifth fragment of content; receiving, from the third viewing device, a request for a sixth fragment of the content, the sixth fragment of the content being immediately subsequent to the fifth fragment of the content; determining that the sixth fragment of the content is not stored at a content storage device at a time of receiving the request; determining that the sixth fragment of the content is expected to be stored at the content storage device within the defined time period; responsive to the determination that the sixth fragment of the content is not stored at the content storage device and the determination that the sixth fragment of the content is expected to be stored at the content storage device within the defined time period, holding the received request for the defined time period; determining, upon expiration of the defined time period, that the sixth fragment of the content is not stored at the content storage device; and responsive to the determination that the sixth fragment of the content is not stored at the content storage device upon expiration of the defined time period, transmitting, to the third viewing device, an error message indicating that the sixth fragment is not available.

Aspect 28. A method for delivering content, comprising: causing a viewing device to receive fragment-level metadata associated with a first fragment of content; receiving, from the viewing device, a request for a second fragment of the content, the second fragment of the content being immediately subsequent to the first fragment of the content; determining that the second fragment of the content is not stored at a content storage device at a time of receiving the request; determining that the second fragment of the content is expected to be stored at the content storage device within a defined time period; responsive to the determination that the second fragment of the content is not stored at the content storage device and the determination that the second fragment of the content is expected to be stored at the content storage device within the defined time period, holding the received request for the defined time period; determining, prior to expiration of the defined time period, that the second fragment of the content is stored at the content storage device; and transmitting the second fragment of the content to the viewing device.

Aspect 29. The method of any previous aspect, further comprising: subsequent to transmitting the second fragment to the viewing device, causing the viewing device to receive fragment-level metadata associated with the second fragment of the content.

Aspect 30. The method of any previous aspect, further comprising: causing the viewing device to process the second fragment of the content, responsive to the viewing device receiving the fragment-level metadata associated with the second fragment of the content.

Aspect 31. The method of any previous aspect, wherein processing the second fragment of the content comprises one or more of: decoding the second fragment of the content; adding the decoded content stored in the second fragment to a playback buffer for playback, or performing a data analysis of the decoded second fragment of content.

Aspect 32. The method of any previous aspect, further comprising: causing the viewing device to process the second fragment of the content, responsive to the viewing device receiving the second fragment of the content, wherein the viewing device processes the second fragment of content without receiving fragment-level metadata associated with the second fragment of the content.

Aspect 33. The method of any previous aspect, further comprising: causing a second viewing device to receive fragment-level metadata associated with a third fragment of content; receiving, from the viewing device, a request for a fourth fragment of the content, the fourth fragment of the content being immediately subsequent to the third fragment of the content; determining that the fourth fragment of the content is not stored at a content storage device at a time of receiving the request; determining that the fourth fragment of the content is not expected to be stored at the content storage device within the defined time period; and responsive to the determination that the fourth fragment of the content is not stored at the content storage device and the determination that the fourth fragment of the content is not expected to be stored at the content storage device within the defined time period, transmitting, to the second viewing device, an error message indicating that the fourth fragment is not available.

Aspect 34. The method of any previous aspect, further comprising: causing a third viewing device to receive fragment-level metadata associated with a fifth fragment of content; receiving, from the third viewing device, a request for a sixth fragment of the content, the sixth fragment of the content being immediately subsequent to the fifth fragment of the content; determining that the sixth fragment of the content is not stored at a content storage device at a time of receiving the request; determining that the sixth fragment of the content is expected to be stored at the content storage device within the defined time period; responsive to the determination that the sixth fragment of the content is not stored at the content storage device and the determination that the sixth fragment of the content is expected to be stored at the content storage device within the defined time period, holding the received request for the defined time period; determining, upon expiration of the defined time period, that the sixth fragment of the content is not stored at the content storage device; and responsive to the determination that the sixth fragment of the content is not stored at the content storage device upon expiration of the defined time period, transmitting, to the third viewing device, an error message indicating that the sixth fragment is not available.

Aspect 35. A system for delivering content, comprising: at least one device including a hardware processor; the system being configured to perform operations comprising: causing a viewing device to receive fragment-level metadata associated with a first fragment of content; receiving, from the viewing device, a request for a second fragment of the content, the second fragment of the content being immediately subsequent to the first fragment of the content; determining that the second fragment of the content is not stored at a content storage device at a time of receiving the request; determining that the second fragment of the content is expected to be stored at the content storage device within a defined time period; responsive to the determination that the second fragment of the content is not stored at the content storage device and the determination that the second fragment of the content is expected to be stored at the content storage device within the defined time period, holding the received request for the defined time period; determining, prior to expiration of the defined time period, that the second fragment of the content is stored at the content storage device; and transmitting the second fragment of the content to the viewing device.

Aspect 36. The system of any previous aspect, the operations further comprising: subsequent to transmitting the second fragment to the viewing device, causing the viewing device to receive fragment-level metadata associated with the second fragment of the content.

Aspect 37. The system of any previous aspect, the operations further comprising: causing the viewing device to process the second fragment of the content, responsive to the viewing device receiving the fragment-level metadata associated with the second fragment of the content.

Aspect 38. The system of any previous aspect, the operations further comprising: causing the viewing device to process the second fragment of the content, responsive to the viewing device receiving the second fragment of the content, wherein the viewing device processes the second fragment of content without receiving fragment-level metadata associated with the second fragment of the content.

Aspect 39. The system of any previous aspect, the operations further comprising: causing a second viewing device to receive fragment-level metadata associated with a third fragment of content; receiving, from the viewing device, a request for a fourth fragment of the content, the fourth fragment of the content being immediately subsequent to the third fragment of the content; determining that the fourth fragment of the content is not stored at a content storage device at a time of receiving the request; determining that the fourth fragment of the content is not expected to be stored at the content storage device within the defined time period; and responsive to the determination that the fourth fragment of the content is not stored at the content storage device and the determination that the fourth fragment of the content is not expected to be stored at the content storage device within the defined time period, transmitting, to the second viewing device, an error message indicating that the fourth fragment is not available.

Aspect 40. The system of any previous aspect, the operations further comprising: causing a third viewing device to receive fragment-level metadata associated with a fifth fragment of content; receiving, from the third viewing device, a request for a sixth fragment of the content, the sixth fragment of the content being immediately subsequent to the fifth fragment of the content; determining that the sixth fragment of the content is not stored at a content storage device at a time of receiving the request; determining that the sixth fragment of the content is expected to be stored at the content storage device within the defined time period; responsive to the determination that the sixth fragment of the content is not stored at the content storage device and the determination that the sixth fragment of the content is expected to be stored at the content storage device within the defined time period, holding the received request for the defined time period; determining, upon expiration of the defined time period, that the sixth fragment of the content is not stored at the content storage device; and responsive to the determination that the sixth fragment of the content is not stored at the content storage device upon expiration of the defined time period, transmitting, to the third viewing device, an error message indicating that the sixth fragment is not available.

Aspect 41. A non-transitory computer-readable medium comprising instructions which, when executed by one or more hardware processors, cause execution of operations comprising: receiving, at a viewing device, metadata associated with a first fragment of content; transmitting, from the viewing device to the content storage device, a first request for the first fragment of the content; transmitting, from the viewing device to a content storage device, a second request for a second fragment of the content, the second fragment of the content immediately preceding the first fragment of the content; receiving, at the viewing device, the first fragment of the content and the second fragment of the content; and processing the first fragment of the content and the second fragment of the content.

Aspect 42. The non-transitory computer-readable medium of any previous aspect, wherein the second fragment of the content is received at the viewing device from the content storage device, subsequent to the viewing device transmitting the first request and the second request.

Aspect 43. The non-transitory computer-readable medium of any previous aspect, wherein the processing comprises adding the first fragment of content and the second fragment of content to a playback buffer for playback.

Aspect 44. The non-transitory computer-readable medium of any previous aspect, wherein the first fragment of the content and the second fragment of the content are added to the playback buffer based on their respective positions in the content.

Aspect 45. The non-transitory computer-readable medium of any previous aspect, wherein the viewing device effects playback of the content when the playback buffer exceeds a threshold length.

Aspect 46. The non-transitory computer-readable medium of any previous aspect, the operations further comprising transmitting, from the viewing device to the content storage device, one or more additional requests for content, the one or more additional requests corresponding to one or more fragments immediately preceding the second fragment of the content.

Aspect 47. The non-transitory computer-readable medium of any previous aspect, wherein a number of the additional requests is sufficient to request all fragments of the content preceding the second fragment of the content.

Aspect 48. A method of transmitting content, comprising: receiving, at a viewing device, metadata associated with a first fragment of content; transmitting, from the viewing device to the content storage device, a first request for the first fragment of the content; transmitting, from the viewing device to a content storage device, a second request for a second fragment of the content, the second fragment of the content immediately preceding the first fragment of the content; receiving, at the viewing device, the first fragment of the content and the second fragment of the content; and processing the first fragment of the content and the second fragment of the content.

Aspect 49. The method of any previous aspect, wherein the second fragment of the content is received at the viewing device from the content storage device, subsequent to the viewing device transmitting the first request and the second request.

Aspect 50. The method of any previous aspect, wherein the processing comprises adding the first fragment of content and the second fragment of content to a playback buffer for playback.

Aspect 51. The method of any previous aspect, wherein the first fragment of the content and the second fragment of the content are added to the playback buffer based on their respective positions in the content.

Aspect 52. The method of any previous aspect, wherein the viewing device effects playback of the content when the playback buffer exceeds a threshold length.

Aspect 53. The method of any previous aspect, the operations further comprising transmitting, from the viewing device to the content storage device, one or more additional requests for content, the one or more additional requests corresponding to one or more fragments immediately preceding the second fragment of the content.

Aspect 54. The method of any previous aspect, wherein a number of the additional requests is sufficient to request all fragments of the content preceding the second fragment of the content.

Aspect 55. A system for transmitting content, comprising: at least one device including a hardware processor; the system being configured to perform operations comprising: receiving, at a viewing device, metadata associated with a first fragment of content; transmitting, from the viewing device to the content storage device, a first request for the first fragment of the content; transmitting, from the viewing device to a content storage device, a second request for a second fragment of the content, the second fragment of the content immediately preceding the first fragment of the content; receiving, at the viewing device, the first fragment of the content and the second fragment of the content; and processing the first fragment of the content and the second fragment of the content.

Aspect 56. The system of any previous aspect, wherein the second fragment of the content is received at the viewing device from the content storage device, subsequent to the viewing device transmitting the first request and the second request.

Aspect 57. The system of any previous aspect, wherein the processing comprises adding the first fragment of content and the second fragment of content to a playback buffer for playback.

Aspect 58. The system of any previous aspect, wherein the viewing device effects playback of the content when the playback buffer exceeds a threshold length.

Aspect 59. The system of any previous aspect, the operations further comprising transmitting, from the viewing device to the content storage device, one or more additional requests for content, the one or more additional requests corresponding to one or more fragments immediately preceding the second fragment of the content.

Aspect 60. The system of any previous aspect, wherein a number of the additional requests is sufficient to request all fragments of the content preceding the second fragment of the content.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method comprising:
receiving, at a viewing device configured to effect playback of content, content-level metadata associated with a video on demand content item, wherein the content-level metadata is selected from a group consisting of one or more of: a content identifier, an initial fragment index, or an ending fragment index;
transmitting, from the viewing device to a content storage device, a first HyperText Transfer Protocol (HTTP) request for a first fragment of the video on demand content item;
receiving, responsive to the first request, the first fragment of the video on demand content item via a first HTTP message;
responsive to receiving the first fragment of the video on demand content item, transmitting, from the viewing device to the content storage device, a second HTTP request for a second fragment of the video on demand content item, the second HTTP request comprising at least a fragment index of the second fragment of the video on demand content item, wherein the viewing device does not receive any fragment metadata related to the second fragment of the video on demand content item prior to requesting the second fragment of the video on demand content item, the second fragment of the video on demand content item being immediately subsequent to the first fragment of the video on demand content item; and
receiving, responsive to the second request, the second fragment of the video on demand content item via a second HTTP message, wherein the second fragment of the video on demand content item is received at the viewing device from the content storage device.

2. The method of claim 1, wherein the content-level metadata comprises at least the content identifier and the initial fragment index.

3. The method of claim 1, further comprising:
processing the first fragment of the video on demand content item, and
processing the second fragment of the video on demand content item.

4. The method of claim 3, wherein processing the first fragment of the video on demand content item comprises one or more of:
decoding the first fragment of the video on demand content item;
adding the decoded video on demand content item stored in the first fragment to a playback buffer for playback, or
performing a data analysis of the decoded first fragment of the video on demand content item.

5. The method of claim 1, wherein the request for the second fragment of the video on demand content item is formed based on a known rule for determining fragment indexes of the fragments of the video on demand content item.

6. The method of claim 1, further comprising, responsive to both receiving the second fragment of the video on demand content item from the content storage device and receiving a trick play request from a user:
transmitting, from the viewing device to the content storage device, a third request for a third fragment of the video on demand content item, wherein the third fragment of the video on demand content item is not adjacent to the second fragment of the video on demand content item, and, wherein the viewing device does not receive any fragment metadata related to the third fragment of the video on demand content item prior to requesting the third fragment of the video on demand content item; and
receiving, responsive to the third request, the third fragment of the video on demand content item, wherein the third fragment of the video on demand content item is received at the viewing device from the content storage device.

7. A system comprising:
at least one device including a hardware processor;
the system being configured to perform operations comprising:
receiving, at a viewing device, content-level metadata associated with a video on demand content item, wherein the content-level metadata is selected from a group consisting of one or more of: a content identifier, an initial fragment index, or an ending fragment index;
transmitting, to a content storage device, a first HyperText Transfer Protocol (HTTP) request for a first fragment of the video on demand content item;
receiving, responsive to the first request, the first fragment of the video on demand content item via a first HTTP message;
responsive to receiving the first fragment of the video on demand content item, transmitting, to the content storage device, a second HTTP request for a second fragment of the video on demand content item the second HTTP request comprising at least a fragment index of the second fragment of the video on demand content item, wherein the viewing device does not receive any fragment metadata related to the second fragment of the video on demand content item prior to requesting the second fragment of the video on demand content item, the second fragment of the video on demand content item being immediately subsequent to the first fragment of the video on demand content item; and
receiving, responsive to the second request, the second fragment of the video on demand content item via a second HTTP message, wherein the second fragment of the video on demand content item is received from the content storage device.

8. The system of claim 7, wherein the content-level metadata comprises at least the content identifier and the initial fragment index.

9. The system of claim 7, the operations further comprising:
processing the first fragment of the video on demand content item, and
processing the second fragment of the video on demand content item.

10. The system of claim 9, wherein processing the first fragment of the content comprises one or more of:
decoding the first fragment of the video on demand content item;
adding the decoded content stored in the first fragment to a playback buffer for playback, or performing a data analysis of the decoded first fragment of the video on demand content item.

11. The system of claim 7, wherein the request for the second fragment of the video on demand content item is formed based on a known rule for determining fragment indexes of the fragments of the video on demand content item.

12. The system of claim 7, the operations further comprising, responsive to both receiving the second fragment of the video on demand content item from the content storage device and receiving a trick play request from a user:
transmitting, from the viewing device to the content storage device, a third request for a third fragment of the video on demand content item, wherein the third fragment of the video on demand content item is not adjacent to the second fragment of the video on demand content item, and, wherein the viewing device does not receive any fragment metadata related to the third fragment of the video on demand content item prior to requesting the third fragment of the video on demand content item; and
receiving, responsive to the third request, the third fragment of the video on demand content item, wherein the third fragment of the video on demand content item is received at the viewing device from the content storage device.

13. A non-transitory computer-readable medium comprising instructions which, when executed by one or more hardware processors, cause execution of operations comprising:
receiving, at a viewing device configured to effect playback of content, content-level metadata associated with a video on demand content item, wherein the content-level metadata is selected from a group consisting of one or more of: a content identifier, an initial fragment index, or an ending fragment index;
transmitting, from the viewing device to a content storage device, a first request for a first fragment of the video on demand content item;
receiving, responsive to the first request, the first fragment of the video on demand content item via a first Hyper-Text Transfer Protocol (HTTP) message;
responsive to receiving the first fragment of the video on demand content item, transmitting, from the viewing device to the storage device, a second request for a second fragment of the video on demand content item the second request comprising at least a fragment index of the second fragment of the video on demand content item, wherein the viewing device does not receive any fragment metadata related to the second fragment of the video on demand content item prior to requesting the second fragment of the video on demand content item, the second fragment of the video on demand content item being immediately subsequent to the first fragment of the video on demand content item; and
receiving, responsive to the second request, the second fragment of the video on demand content item via a second HTTP message, wherein the second fragment of the video on demand content item is received at the viewing device from the content storage device.

14. The non-transitory computer-readable medium of claim 13, wherein the content-level metadata comprises at least the content identifier and the initial fragment index.

15. The non-transitory computer-readable medium of claim 13, the operations further comprising:
processing the first fragment of content the video on demand content item, and
processing the second fragment of content the video on demand content item.

16. The non-transitory computer-readable medium of claim 15, wherein processing the first fragment of the video on demand content item comprises one or more of:
decoding the first fragment of the video on demand content item;
adding the decoded content stored in the first fragment of the video on demand content item to a playback buffer for playback, or
performing a data analysis of the decoded first fragment of content the video on demand content item.

17. The non-transitory computer-readable medium of claim 13, wherein the request for the second fragment of the video on demand content item is formed based on a known rule for determining fragment indexes of the fragments of the video on demand content item.

18. The non-transitory computer-readable medium of claim 13, further comprising, responsive to both receiving the second fragment of the video on demand content item from the content storage device and receiving a trick play request from a user:
transmitting, from the viewing device to the content storage device, a third request for a third fragment of the video on demand content item, wherein the third fragment of the video on demand content item is not adjacent to the second fragment of the video on demand content item, and, wherein the viewing device does not receive any fragment metadata related to the third fragment of the video on demand content item prior to requesting the third fragment of the video on demand content item; and
receiving, responsive to the third request, the third fragment of the video on demand content item, wherein the third fragment of the video on demand content item is received at the viewing device from the content storage device.

* * * * *